US012629973B2

(12) United States Patent
DeWitt et al.

(10) Patent No.: US 12,629,973 B2
(45) Date of Patent: May 19, 2026

(54) TOW HOOK ASSEMBLIES AND VEHICLES INCLUDING SAME

(71) Applicant: Toyota Motor Engineering & Manufacturing North America, Inc., Plano, TX (US)

(72) Inventors: George DeWitt, Ypsilanti, MI (US); Jeremiah T. Hammer, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 741 days.

(21) Appl. No.: 17/973,068

(22) Filed: Oct. 25, 2022

(65) Prior Publication Data

US 2024/0131885 A1 Apr. 25, 2024
US 2024/0227475 A9 Jul. 11, 2024

(51) Int. Cl.
*B60D 1/56* (2006.01)
*B60D 1/24* (2006.01)
*B60R 19/48* (2006.01)

(52) U.S. Cl.
CPC ............... *B60D 1/56* (2013.01); *B60D 1/243* (2013.01); *B60R 19/48* (2013.01)

(58) Field of Classification Search
CPC ... B60D 1/04; B60D 1/07; B60D 1/48; B60D 1/56; B60D 1/485; B60D 1/565; B60R 19/34; B60R 19/48; B60R 2019/1806; B62D 25/209

USPC ............................. 280/478.1, 480, 495, 504
See application file for complete search history.

(56) References Cited

U.S. PATENT DOCUMENTS

| | | | |
|---|---|---|---|
| 8,246,069 B2 | 8/2012 | Ladzinski et al. | |
| 10,029,524 B2 | 7/2018 | Chang et al. | |
| 2018/0037075 A1* | 2/2018 | Chang ..................... | B60D 1/48 |
| 2018/0229562 A1* | 8/2018 | Farooq ................... | B60R 21/34 |

FOREIGN PATENT DOCUMENTS

| | | |
|---|---|---|
| CN | 213472684 U | 6/2021 |
| CN | 213948049 U | 8/2021 |
| JP | 2006168523 A | 6/2006 |
| JP | 2008012978 A | 1/2008 |

* cited by examiner

*Primary Examiner* — Alentin Neacsu
*Assistant Examiner* — Felicia L. Brittman-Alabi
(74) *Attorney, Agent, or Firm* — Dinsmore & Shohl LLP

(57) ABSTRACT

A tow hook assembly including a crush box and a tow hook. The crush box includes a support section having a first end and an opposite second end, the tubular support section extending in a vehicle longitudinal direction, and a connector section provided at the first end of the tubular support section, the connector section including a face plate extending in a vehicle vertical direction perpendicular to the vehicle longitudinal direction, and an upper plate extending from an upper end of the face plate in the vehicle longitudinal direction. The tow hook includes a body having a first portion provided on an upper surface of the upper plate and extending parallel to the upper plate, and an attachment member extending at an oblique angle from the first portion.

18 Claims, 11 Drawing Sheets

TOW HOOK ASSEMBLIES AND VEHICLES INCLUDING SAME

TECHNICAL FIELD

The present specification generally relates to tow hook assemblies and, more specifically, tow hook assemblies having a tow hook that may be coupled to a vehicle and reduce a force against a barrier during a front end collision.

BACKGROUND

Current tow hooks may attach or be fixed to a vehicle at different connection points so that the tow hook is operable to remain on the vehicle while a towing force is applied to the tow hook. However, in many conventional tow hooks, the tow hook is connected to the vehicle in a way that may damage one or more parts of the vehicle during a front end or side collision.

Accordingly, a need exists for improved tow hook assembly apparatuses that reduce damage to parts of a vehicle.

SUMMARY

In one embodiment, a tow hook assembly includes: a crush box comprising: a support section having a first end and a second end opposite the first end, the support section extending in a vehicle longitudinal direction; and a connector section provided at the first end of the support section, the connector section including a face plate extending in a vehicle vertical direction perpendicular to the vehicle longitudinal direction, and an upper plate extending from an upper end of the face plate in the vehicle longitudinal direction; and a tow hook comprising: a body having a first portion provided on an upper surface of the upper plate of the connector section and extending parallel to the upper plate; and an attachment member extending at an oblique angle from the first portion of the body.

In another embodiment, a tow hook assembly includes: a crush box comprising: a support section having a first end and a second end opposite the first end, the support section extending in a vehicle longitudinal direction; and a connector section provided at the first end of the support section, the connector section including a face plate extending in a vehicle vertical direction perpendicular to the vehicle longitudinal direction, and an upper plate extending from an upper end of the face plate in the vehicle longitudinal direction; and a tow hook comprising: a body provided on at least a portion of the face plate of the connector section of the crush box and extending from a first end to a second end opposite the first end in the vehicle vertical direction; and an attachment member extending from the first end of the body in the vehicle vertical direction.

In yet another embodiment, a tow hook assembly includes: a crush box comprising: a support section having a first end and a second end opposite the first end, the support section extending in a vehicle longitudinal direction; and a connector section provided at the first end of the support section, the connector section including a face plate extending in a vehicle vertical direction perpendicular to the vehicle longitudinal direction, and an upper plate extending downward from an upper end of the face plate in the vehicle longitudinal direction; and a tow hook comprising: a body provided on at least a portion of the face plate of the connector section of the crush box and extending from a first end to a second end opposite the first end in the vehicle vertical direction; and an attachment member extending from the second end of the body in the vehicle longitudinal direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
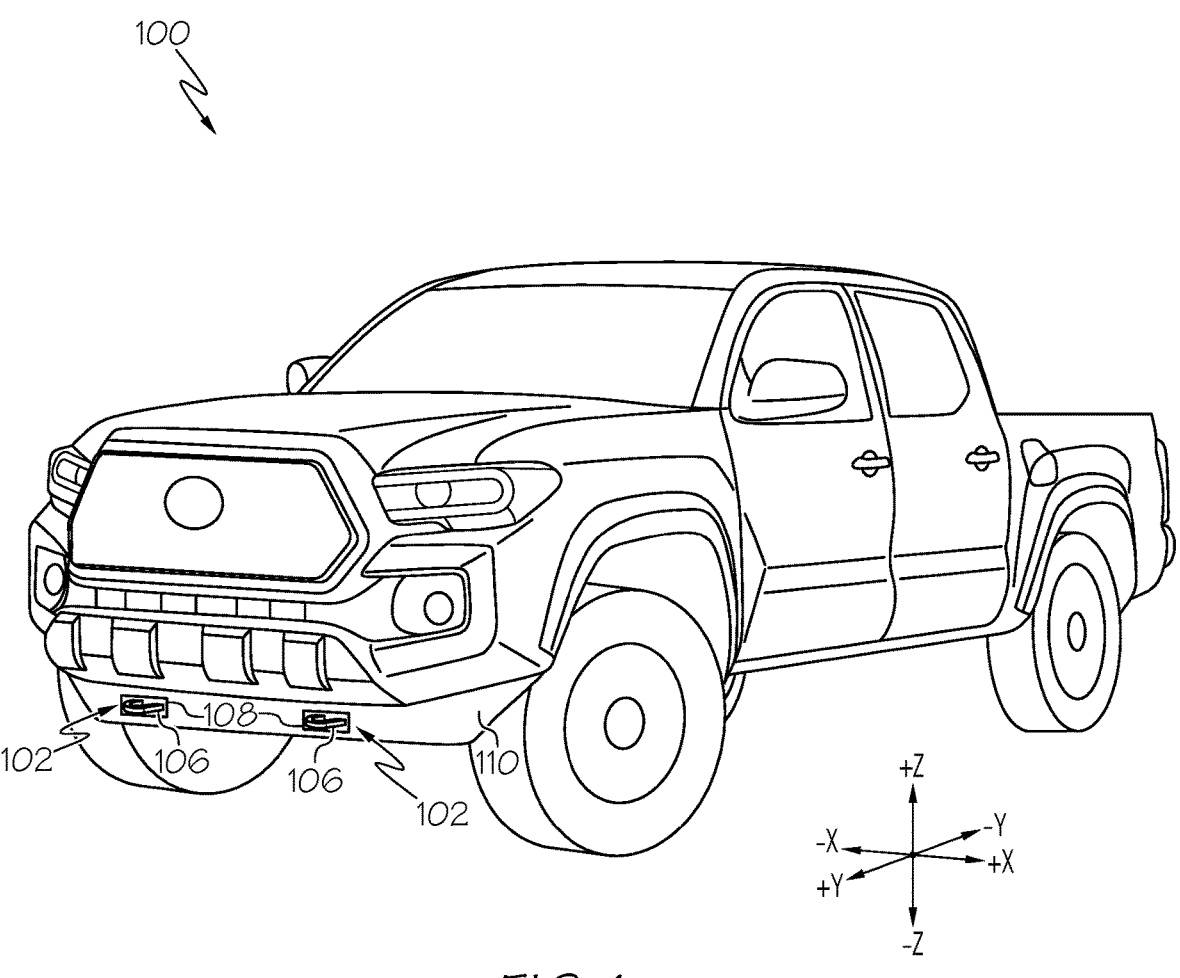
FIG. 1 schematically depicts a perspective view of a vehicle including a pair of tow hooks, according to one or more embodiments shown and described herein.

Embodiments described herein are directed to tow hook assemblies that include a crush box having a support section and a connector section, and a tow hook having a body and an attachment member coupled or otherwise fixed to the connector section of the crush box. The various components of the tow hook assemblies disclosed herein may be positioned such that a likelihood of potential injury to a pedestrian, as well as damage to other components of the vehicle, is reduced during a front end collision. Various embodiments of the apparatus and operation of the apparatus are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a perspective view of a vehicle 100. As used herein, a vehicle 100 may refer to any instrument that is operable to transport people and/or goods from one location to another. For example, the vehicle 100 may include, but is not limited to, an automobile, car, bus, truck, boat, and the like. The vehicle 100 may comprise one or more tow hook assemblies 102. As shown in FIG. 1, the vehicle 100 includes a pair of tow hook assemblies 102. Each tow hook assembly 102 may be connected to any portion of the vehicle 100. For example, in some embodiments, the tow hook assemblies 102 may be attached to a front bumper or bumper beam of the vehicle 100. More particularly, in embodiments, the tow hook assemblies 102 may be attached to extend above the bumper beam of the vehicle 100. In other embodiments, the tow hook assemblies 102 may be attached to extend below the bumper beam of the vehicle 100. For example, the tow hook assemblies 102 may be positioned to extend below the bumper beam of the vehicle 100 such that a tow hook of the tow hook assembly 102 may be configured to receive a tow strap extending in a vehicle longitudinal direction below the bumper beam of the vehicle 100. In some embodiments, as shown in FIG. 1, the tow hook assemblies 102 may include a tow hook 106 extending in a vehicle longitudinal direction such that at least a portion of the tow hook 106, which is mounted to the bumper beam, extends through an opening 108 formed in a bumper cover 110. The bumper cover 110 is positioned forward of the bumper beam in the vehicle longitudinal direction such that the bumper beam is not illustrated in FIG. 1.

Figure 2:
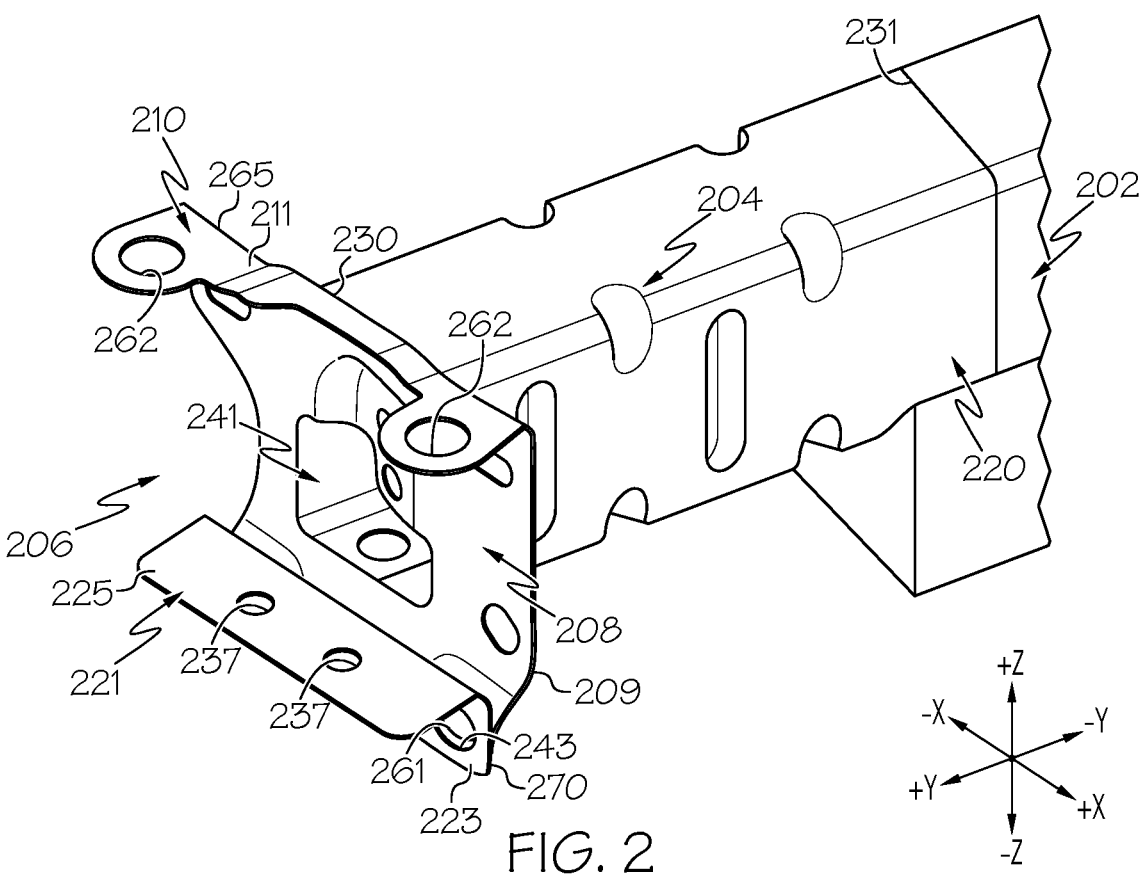
FIG. 2 schematically depicts a perspective view of a crush box connected to a vehicle frame of the vehicle of FIG. 1, according to one or more embodiments shown and described herein.

Referring now to FIG. 2, a perspective view of a crush box 220 connected to part of a vehicle frame 202 of the vehicle 100 (FIG. 1) is shown. The term "vehicle frame" may refer to any supporting structure of the vehicle 100 to which other components are attached. Moreover, the term "crush box" may refer to an energy absorbing device installed onto the vehicle frame 202 in order to reduce the impact force exhibited during vehicle collisions, such as a front end collision to a bumper beam. The crush box 220 may include a support section 204 having a distal first end 230 and a proximate second end 231 opposite the first end 230. The support section 204 extends in the vehicle longitudinal direction. The proximate second end 231 of the support section 204 of the crush box 220 is connected to the vehicle frame 202. In some embodiments, the support section 204 of the crush box 220 may be hollow.

The crush box 220 further includes a connector section 206 provided at the distal first end 230 of the support section 204 of the crush box 220. In embodiments, the connector section 206 of the crush box 220 includes a face plate 208 extending in the vehicle vertical direction perpendicular to the vehicle longitudinal direction. The face plate 208 includes an upper end 265, a lower end 270 opposite the upper end 265, and a rear surface 209 facing the support section 204. In some embodiments, a cutout 241 may be formed in the face plate 208 of the connector section 206 such that at least a portion of the center of the face plate 208 is removed to expose an interior of the support section 204 of the crush box 220. One or more openings 261 may be formed in the face plate 208 proximate the lower end 270 of the face plate 208.

The connector section 206 of the crush box 220 may also include an upper plate 210 having an upper surface 211 that extends from the upper end 265 of the face plate 208 in the vehicle longitudinal direction. One or more openings 262 may be formed in the upper plate 210 such that a fastener 280 (FIG. 4) may be positioned through the one or more openings 262 and connect the upper plate 210 to a different component of the vehicle 100, such as an upper wall 214 of a bumper beam 290 as described in greater detail below.

In some embodiments, the connector section 206 of the crush box 220 includes a lower plate 221. In embodiments, the lower plate 221 may extend from the lower end 270 of the face plate 208. In other embodiments, the lower plate 221 is separate from the connector section 206 and may be fixed to the lower end 270 of the face plate 208 using one or more fasteners 253 (FIG. 4) or the like. As shown in FIG. 2, the lower plate 221 is a substantially L-shaped member including a vertical wall portion 223 and a horizontal wall portion 225 extending from an upper end of the vertical wall portion 223. One or more openings 237 may be formed in the horizontal wall portion 225 of the lower plate 221, through which a fastener 251 (FIG. 4) or the like may extend to secure the lower plate 221 to a bottom wall 215 of the bumper beam 290, and one or more openings 243 may be formed in the vertical wall portion 223, through which the fastener 253 or the like may extend to secure the lower plate 221 to the face plate 208 as described in greater detail below. The openings 243 formed in the vertical wall portion 223 of the lower plate 221 may be coaxial with the openings 261 formed in the face plate 208 proximate the lower end 270. As referred to herein, the term "coaxial" refers to two components sharing a common axis.

Figure 3:
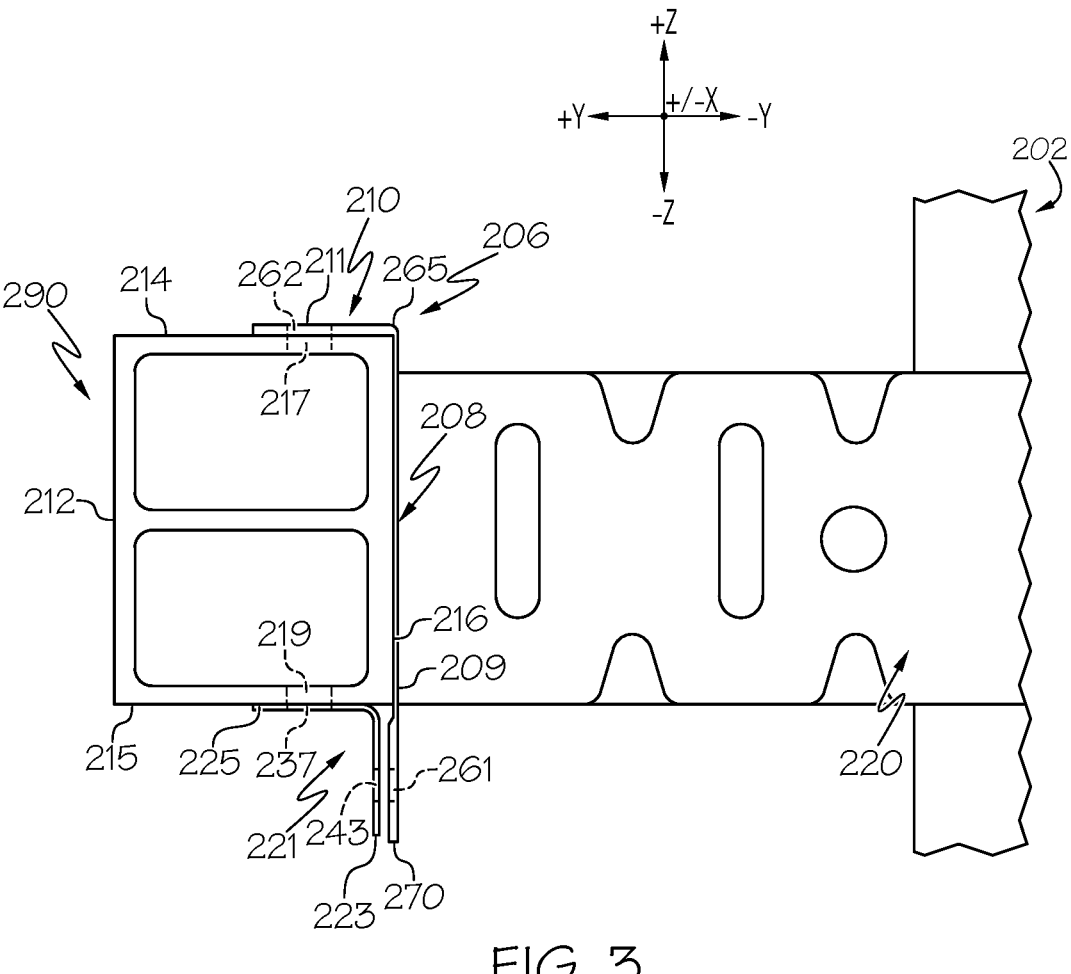
FIG. 3 schematically depicts a side view of the crush box of FIG. 2 extending between the vehicle frame and a bumper beam of the vehicle of FIG. 1, according to one or more embodiments shown and described herein.

Referring now to FIG. 3, a side view of the crush box 220 connected to the bumper beam 290 is shown. The term "bumper beam" may refer to a crossbar provided at a front end of the vehicle 100 and contains one or more attachment sections that connect to a different part of the vehicle 100 (FIG. 1). The bumper beam 290 includes the upper wall 214, the lower wall 215 opposite the upper wall 214, a front wall 212 extending between the upper wall 214 and the lower wall 215, and a rear wall 216 extending between the upper wall 214 and the lower wall 215 opposite the front wall 212. In embodiments, an opening 217 may be formed in the upper wall 214 of the bumper beam 290. In embodiments, an opening 219 may be formed in the lower wall 215 of the bumper beam 290.

In some embodiments, the upper plate 210 of the connector section 206 of the crush box 220 extends from the upper end 265 of the face plate 208 in the vehicle longitudinal direction parallel to the upper wall 214 of the bumper beam 290. The upper plate 210 of the connector section 206 of the crush box 220 may lie flush against at least a portion of the upper wall 214 of the bumper beam 290. Accordingly, the opening 217 formed in the upper wall 214 of the bumper beam 290 may be coaxial with the opening 262 formed in the upper plate 210 of the connector section 206. In some embodiments, the face plate 208 of the connector section 206 of the crush box 220 may extend parallel to the rear wall 216 of the bumper beam 290. In some embodiments, the face plate 208 of the connector section 206 of the crush box 220 may lie flush against at least a portion of the rear wall 216 of the bumper beam 290. Additionally, in some embodiments, the horizontal wall portion 225 of the lower plate 221 may be positioned to lie flush against at least a portion of the lower wall 215 of the bumper beam 290. Accordingly, the opening 219 formed in the lower wall 215 of the bumper beam 290 may be coaxial with the opening 237 formed in the lower plate 221 of the connector section 206.

Figure 4:
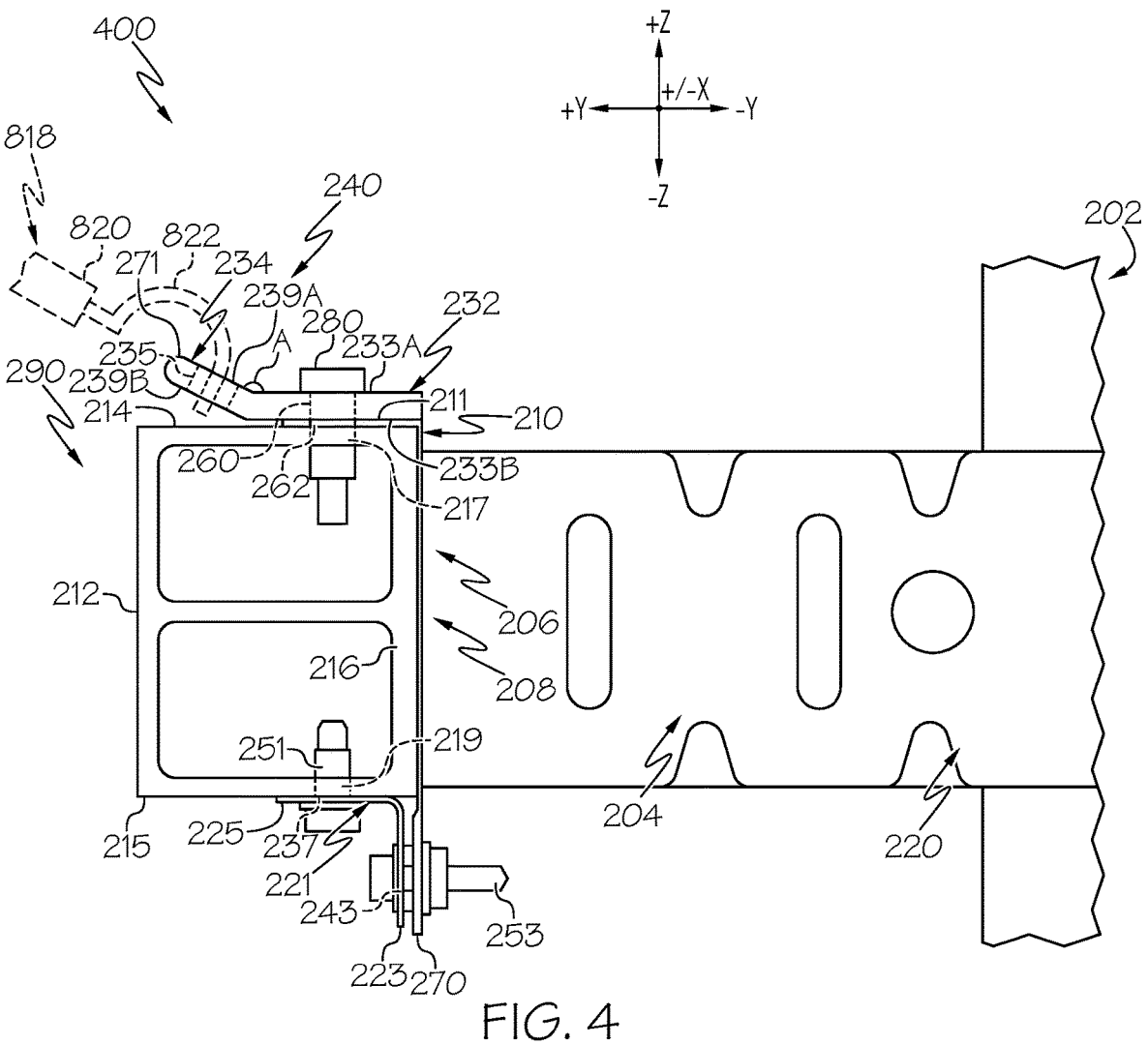
FIG. 4 schematically depicts a side view of the tow hook coupled to an upper wall of the bumper beam, according to one or more embodiments shown and described herein.

Referring now to FIG. 4, a side view of a tow hook assembly 400 including a tow hook 240 coupled to the upper wall 214 of the bumper beam 290 is shown. As referred to herein, the tow hook assembly 400 may include the crush box 220 and the tow hook 240. In one or more embodiments, the tow hook 240 may include a body 232 and an attachment member 234 that extends from the body 232. The body 232 an upper surface 233A, an opposite lower surface 233B, and an opening 260 may be formed in the body 232 so as to extend between the upper surface 233A and the lower surface 233B. The attachment member 234 includes an upper surface 239A and an opposite lower surface 239B.

In embodiments, the upper surface 239A of the attachment member 234 extends at an oblique angle A from the upper surface 233A of the body 232 in a direction opposite the crush box 220. The term "oblique" refers to any angle that is not a right angle or multiple right angles. For example, the upper surface 239A of the attachment member 234 of the tow hook 240 may extend from the upper surface 233A of the body 232 at the angle A between about 95 degrees to about 175 degrees, about 120 degrees to about 170 degrees, about 130 degrees to about 160 degrees, about 140 degrees to about 150 degrees. As the attachment member 234 is angled with respect to the body member 232, the lower surface 239B of the attachment member 234 is spaced apart from the upper surface 214 of the bumper beam 290. Specifically, a distance between the lower surface 239B of the attachment member 234 and the upper surface 214 of the bumper beam 290 increases as the attachment member 234 extends from the base member 232 towards a leading end 271.

The leading end 271 of the attachment member 234 is provided opposite the body 232. The attachment member 234 may be of any suitable shape or size such that a tow strap 818 may attach to the attachment member 234 of the tow hook 240, as discussed in more detail herein. In some embodiments, the attachment member 234 of the tow hook 240 may include a slot 235 that extends between the upper surface 239A and the lower surface 239B. The tow strap 818 may be received within the slot 235. In embodiments, the tow strap 818 may include a strap portion 820 and a connection portion 822 extending from the strap portion 820. The connection portion 822 connects to the tow hook 240, specifically, the slot 235 of the attachment portion 234. In other embodiments, an alternative tow strap (not shown) may be placed and tightened around the leading end 271 of the attachment member 234 of the tow hook 240 to extend through the slot 235. The tow hook 240 may then receive the tow strap passing a first end of the tow strap through the slot

235 and tying the first end of the tow strap to another section of the tow strap such that the tow strap is secured within the slot 235 of the tow hook 240. In other embodiments, the attachment member 234 may form a hook shape, for example, by having a J-shaped bar.

Referring still to FIG. 4, with the tow hook 240 coupled to the bumper beam 290, the body 232 of the tow hook 240 is positioned against at least a portion of the upper surface 211 of the upper plate 210 of the connector section 206 of the crush box 220. In some embodiments, the body 232 of the tow hook 240 may abut directly or indirectly against at least a portion of the upper surface 211 of the upper plate 210 of the connector section 206 of the crush box 220. The body 232 of the tow hook 240, the upper plate 210 of the connector section 206 of the crush box 220, and the upper wall 214 of the bumper beam 290 may be positioned such that the body 232 of the tow hook 240 is positioned above and contacts at least a portion of the upper plate 210 and the upper plate 210 is positioned above and contacts at least a portion of the upper wall 214 of the bumper beam 290. In other words, the upper plate 210 of the connector section 206 of the crush box 220 is sandwiched between the body 232 of the tow hook 240 and the upper wall 214 of the bumper beam 290.

With the tow hook 240 positioned on the connector section 206 of the crush box 220, the opening 260 formed in the body 232 of the tow hook 240 may be coaxial with the opening 262 formed in the upper plate 210 of the connector section 206 of the crush box 220, as well as the opening 217 formed in the upper wall 214 of the bumper beam 290. Accordingly, a fastener 280 may extend through each of the opening 260 formed in the body 232 of the tow hook 240, the opening 262 formed in the upper plate 210 of the connector section 206 of the crush box 220, and the opening 217 formed in the upper wall 214 of the bumper beam 290 to secure the tow hook 240 and the connector section 206 of the crush box 220 to the upper wall 214 of the bumper beam 290. The fastener 280 may be any suitable fastening mechanism such as, for example, a threaded fastener, rivet, weld, adhesive, and the like.

In addition, as discussed herein, the lower plate 221 of the connector section 206 of the crush box 220 extends below the lower wall 215 of the bumper beam 290. The lower plate 221 may be coupled to at least a portion of the lower wall 215 of the bumper beam 290 by a fastener 251 extending through the opening 237 formed in the horizontal wall portion 225 of the lower plate 221 and the opening 219 formed in the lower wall 215 of the bumper beam 290. The fastener 251 may be any suitable fastening mechanism such as, for example, a threaded fastener, rivet, weld, adhesive, and the like.

In embodiments, the lower plate 221 may also be coupled to the face plate 208 of the connector section 206 of the crush box 220 by a fastener 253 extending through the opening 237 formed in the vertical wall portion 223 of the lower plate 221 and the opening 261 formed in the face plate 208 of the connector section 206 of the crush box 220 proximate the lower end 270 of the face plate 208. The fastener 253 may be any suitable fastening mechanism such as, for example, a threaded fastener, rivet, weld, adhesive, and the like. In some embodiments, the lower surface 233B of the body 232 does not extend below the upper surface 214 of the bumper beam 290 in the vehicle vertical direction. Specifically, the body 232 may have a generally planar plate shape.

Figure 5:
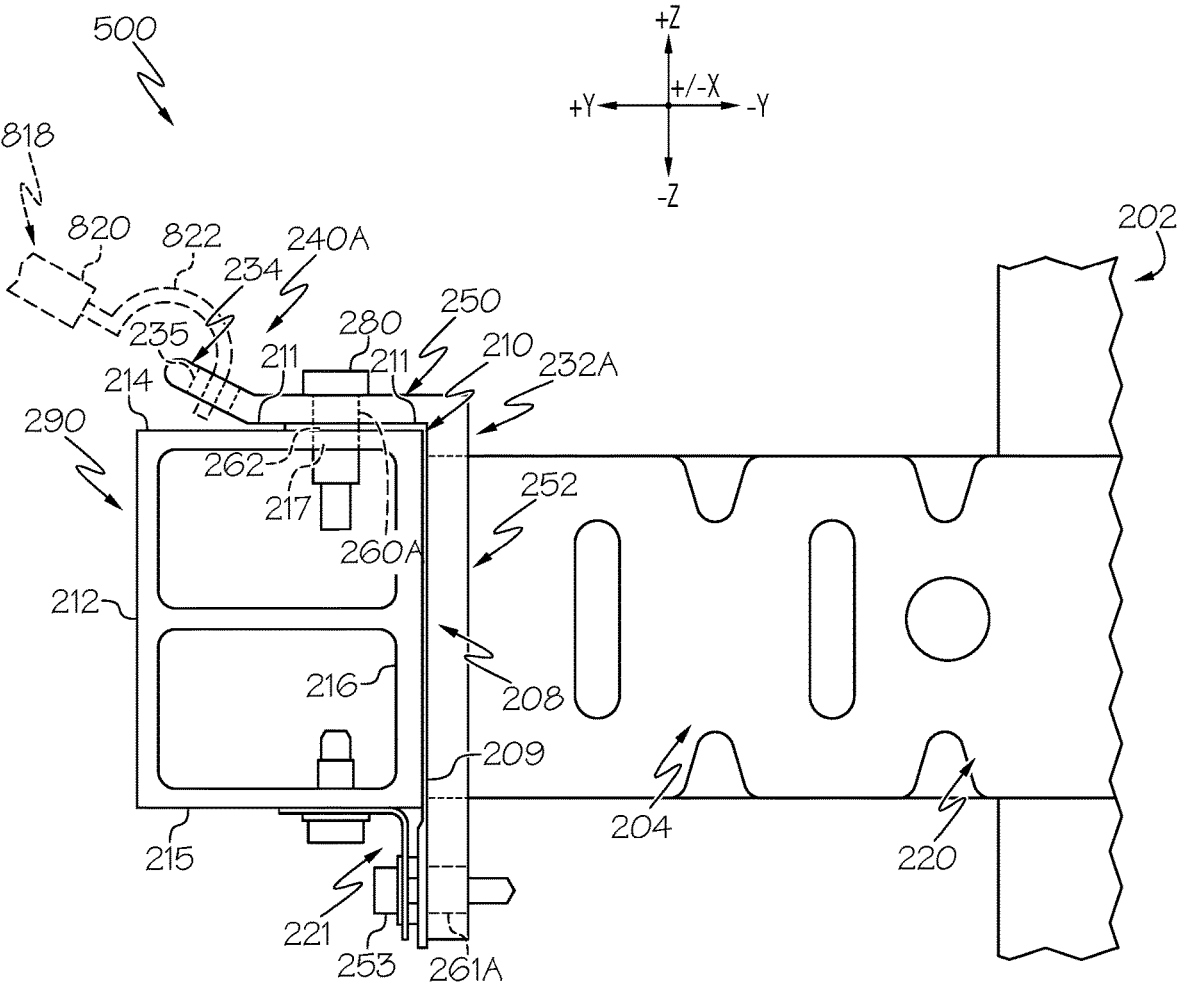
FIG. 5 schematically depicts a side view of another tow hook coupled to the upper wall of the bumper beam, according to one or more embodiments shown and described herein.

Referring now to FIG. 5, a side view of a tow hook assembly 500 including a tow hook 240A and the crush box 220 is shown. It should be appreciated that the tow hook assembly 500 is similar to the tow hook assembly 400 of FIG. 4 with the exception of the tow hook 240A including a body 232A that is a substantially L-shaped member, rather than the planar body 232 of the tow hook 240. As such, like parts will be described herein with like reference numerals. Accordingly, it should be appreciated that the tow hook 240A may still include the attachment member 234 extending at an oblique angle from the body 232A of the tow hook 240A, as described herein.

In one or more embodiments, the body 232A of the tow hook 240A may include a first portion 250 and a second portion 252 extending downward and perpendicular from an end of the first portion 250 of the body 232A opposite the attachment member 234 in the vehicle vertical direction. The first portion 250 may have an opening 260A formed therein and the second portion 252 may have an opening 261A formed therein.

With the tow hook 240A positioned on the bumper beam 290, the first portion 250 of the body 232A extends parallel to the upper plate 210 of the connector section 206 of the crush box 220 so as to abut either directly or indirectly against at least a portion of the upper surface 211 of the upper plate 210. Additionally, the second portion 252 of the body 232A extends parallel to the rear surface 209 of the face plate 208 opposite the rear wall 216 of the bumper beam 290 so as to abut either directly or indirectly against at least a portion of the rear surface 209 of the face plate 208. Accordingly, the upper plate 210 of the connector section 206 of the crush box 220 is sandwiched between the first portion 250 of the body 232A of the tow hook 240A and the upper wall 214 of the bumper beam 290. Additionally, the face plate 208 of the connector section 206 of the crush box 220 is sandwiched between the second portion 252 of the body 232A of the tow hook 240A and the rear wall 216 of the bumper beam 290.

The tow hook 240A is coupled to the bumper beam 290 in a manner similar to that in which the tow hook 240 is coupled to the bumper beam 290, as described herein. Specifically, the fastener 280 extends the opening 260A formed in the body 232A (within the first portion 250 of the body 232A), the opening 262 formed in the upper plate 210 of the connector section 206 of the crush box 220, and the opening 217 formed in the upper wall 214 of the bumper beam 290 to secure the tow hook 240A and the connector section 206 of the crush box 220 to the upper wall 214 of the bumper beam 290. Additionally, the fastener 253 may be provided to extend through the lower plate 221, the face plate 208, and the opening 261A formed in the second portion 252 of the body 232A. In other embodiments, the tow hook 240A may be formed as a one-piece, monolithic structure with the face plate 208 of the crush box 220

Figure 6:
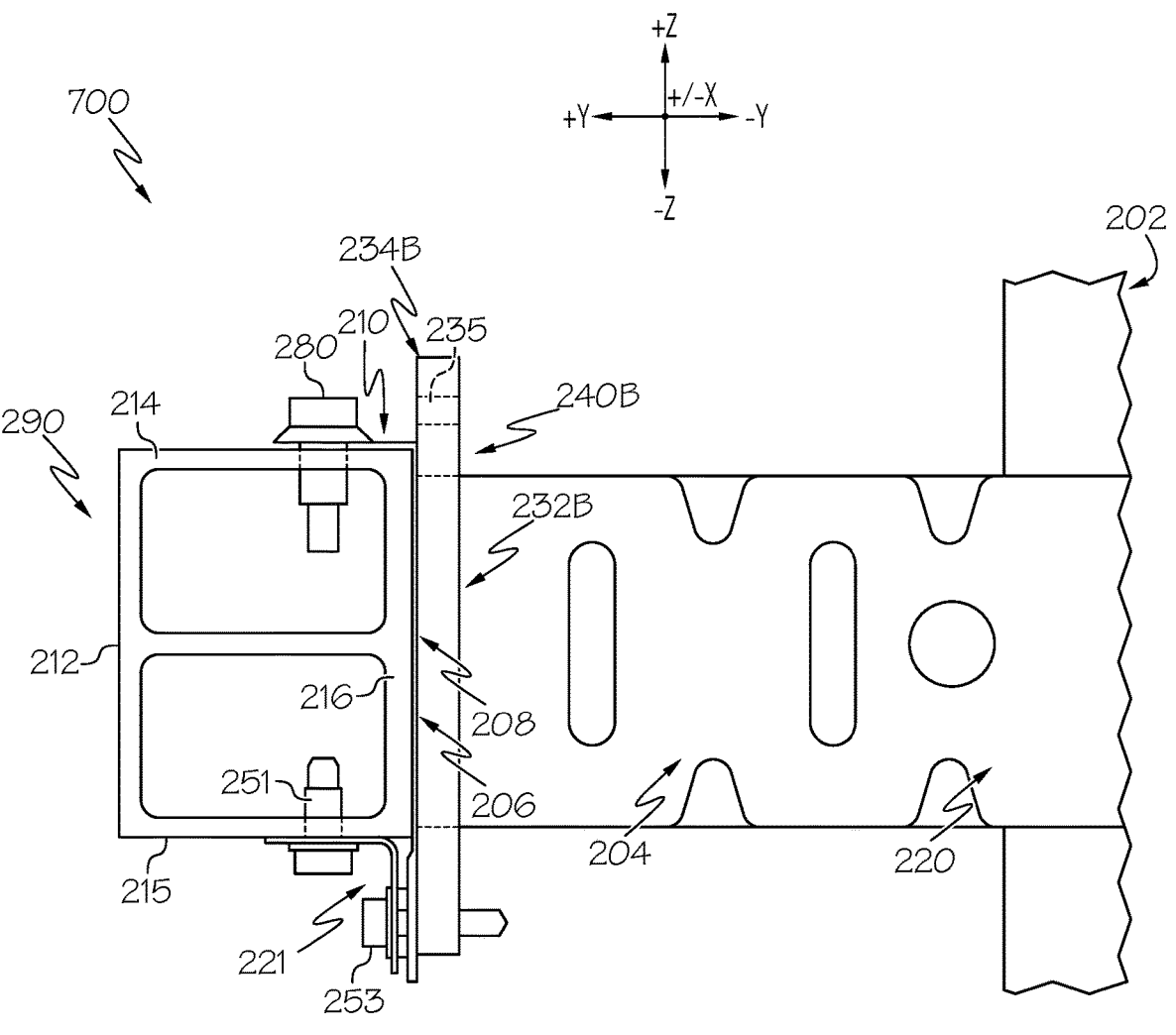
FIG. 6 schematically depicts a side view of another tow hook coupled to the bumper beam, according to one or more embodiments shown and described herein.

Referring now to FIG. 6, a side view of a tow hook assembly 700 including a tow hook 240B and the crush box 220 is shown. It should be appreciated that the tow hook assembly 700 is similar to the tow hook assembly 500 of FIG. 5 with the exception of the tow hook 240B including a body 232B that extends entirely parallel to the rear wall 216 of the bumper beam 290 rather than being a substantially L-shaped member of the tow hook 240A, as described in more detail herein. As such, like parts will be described herein with like reference numerals. Additionally, the tow hook 240B includes an attachment member 234B that extends parallel to and in line with the body 232B rather than extending at an oblique angle therefrom, such as the attachment member 234 of the tow hooks 240, 240A.

With the tow hook 240B positioned on the bumper beam 290, the face plate 208 of the connector section 206 of the crush box 220 is sandwiched between the body 232B of the tow hook 240B and the rear wall 216 of the bumper beam 290. As described herein, the upper plate 210 of the connector section 206 of the crush box 220 is positioned on an upper wall 214 of the bumper beam 290. However, the tow hook 240B may be positioned such that the attachment member 234B of the tow hook 240B does not contact and extend parallel to the upper surface of the upper plate 210 of the connector section 206 of the crush box 220. Rather, the attachment member 234B of the tow hook 240B extends from the body 232B in the vehicle vertical direction opposite the lower wall 215 of the bumper beam 290 above the upper wall 214 of the bumper beam 290.

As discussed herein with respect to the attachment member 234, the attachment member 234B of the tow hook 240B may include the slot 235 formed therein to receive a tow strap. As such, the attachment member 234B of the tow hook 240B may extend from body 232B in the vehicle vertical direction such that the slot 235 formed in the attachment member 234B of the tow hook 240B is positioned above the upper wall 214 of the bumper beam 290 and the upper plate 210 of the connector section 206 of the crush box 220. Accordingly, the fastener 280, which extends through the upper plate 210 of the connector section 206 and the upper wall 214 of the bumper beam 290, does not extend through the tow hook 240B. Rather, the tow hook 240B is coupled to the bumper beam 290 via the fasteners 251, 253 and the lower plate 221.

Figure 7:
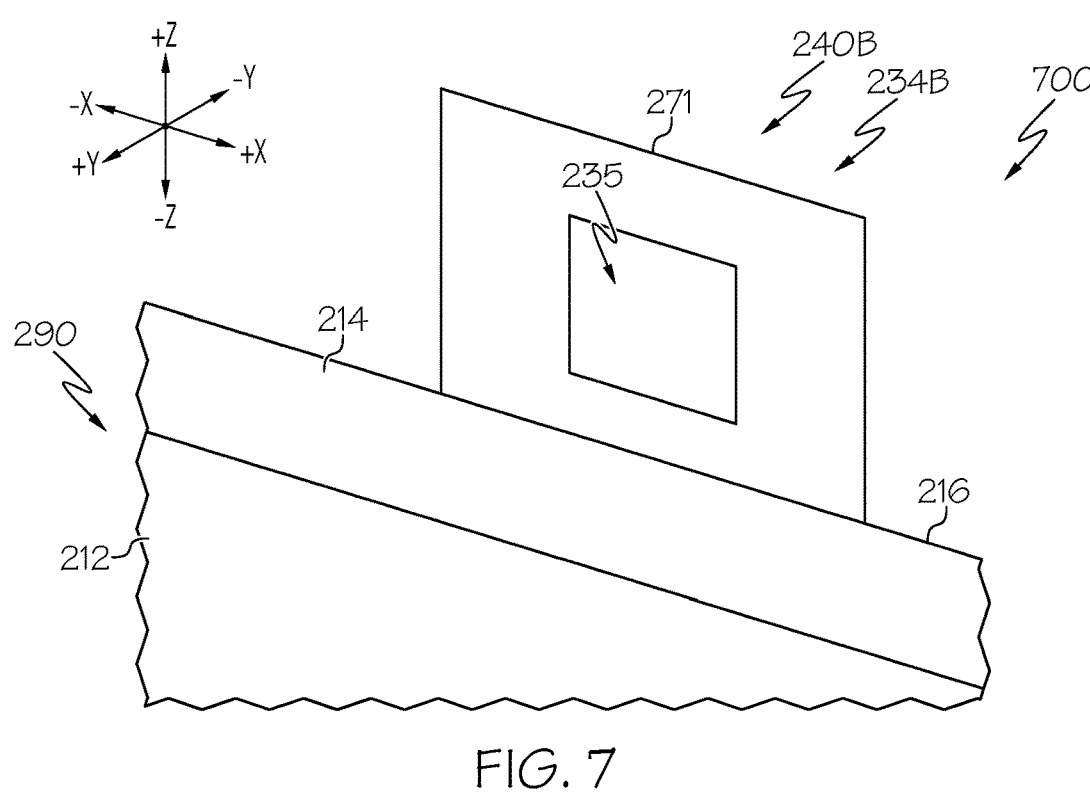
FIG. 7 schematically depicts a perspective view of an attachment member of the tow hook of FIG. 6, according to one or more embodiments shown and described herein.

Referring now to FIG. 7, a partial front perspective view of the tow hook assembly 700 is shown. The attachment member 234B of the tow hook 240B is shown extending above the upper wall 214 of the bumper beam 290. As described herein, a tow strap, for example the tow strap 818 (FIG. 3) may be attached to the attachment member 234B of the tow hook 240B, which may be subsequently attached to an object towing the vehicle 100 or being towed by the vehicle 100. In embodiments, a tow strap may extend through the slot 235 formed in the attachment member 234B and looped around a leading end 271 of the attachment member 234B to attach back onto itself.

Figure 8:
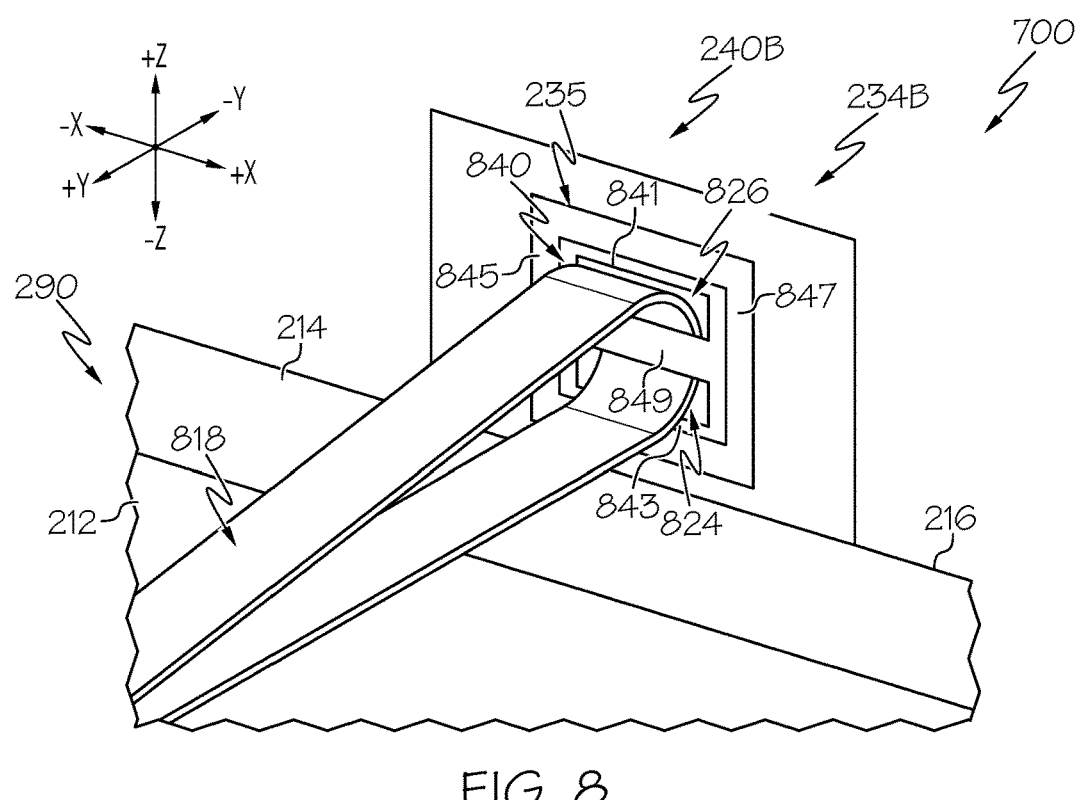
FIG. 8 schematically depicts a perspective view of the attachment member of FIG. 7 including an attachment cover and a tow strap, according to one or more embodiments shown and described herein.

Referring now to FIG. 8, a front perspective view of the tow hook assembly 700 is shown including an attachment cover 840 positioned within the slot 235. The attachment cover 840 includes an upper member 841, a lower member 843 opposite the upper member 841, a first side member 845 extending between the upper member 841 and the lower member 843, a second side member 847 extending between the upper member 841 and the lower member 843, and a center member 849 extending between the first side member 845 and the second side member 847 and spaced between the upper member 841 and the lower member 843. A first opening portion 824 is formed within the attachment cover 840 between the lower member 843 and the center member 849, and a second opening portion 826 is formed within the attachment cover 840 between the upper member 841 and the center member 849. As shown, a tow strap 818 may extend through the first opening portion 824 and the second opening portion 826 of the attachment cover 840, which may be subsequently secured to an object towing the vehicle 100 or being towed by the vehicle 100, as discussed herein. It is to be understood that this is merely one example of how a tow strap 818 may be coupled to the attachment member 234B of the tow hook 240B and that various other configurations are within the scope of the present disclosure. Additionally, it should be appreciated that the other embodiments of tow hooks such as, for example, tow hooks 240, 240A, may be configured to receive the attachment cover 840 to permit a tow strap to be coupled thereto.

Figure 9:
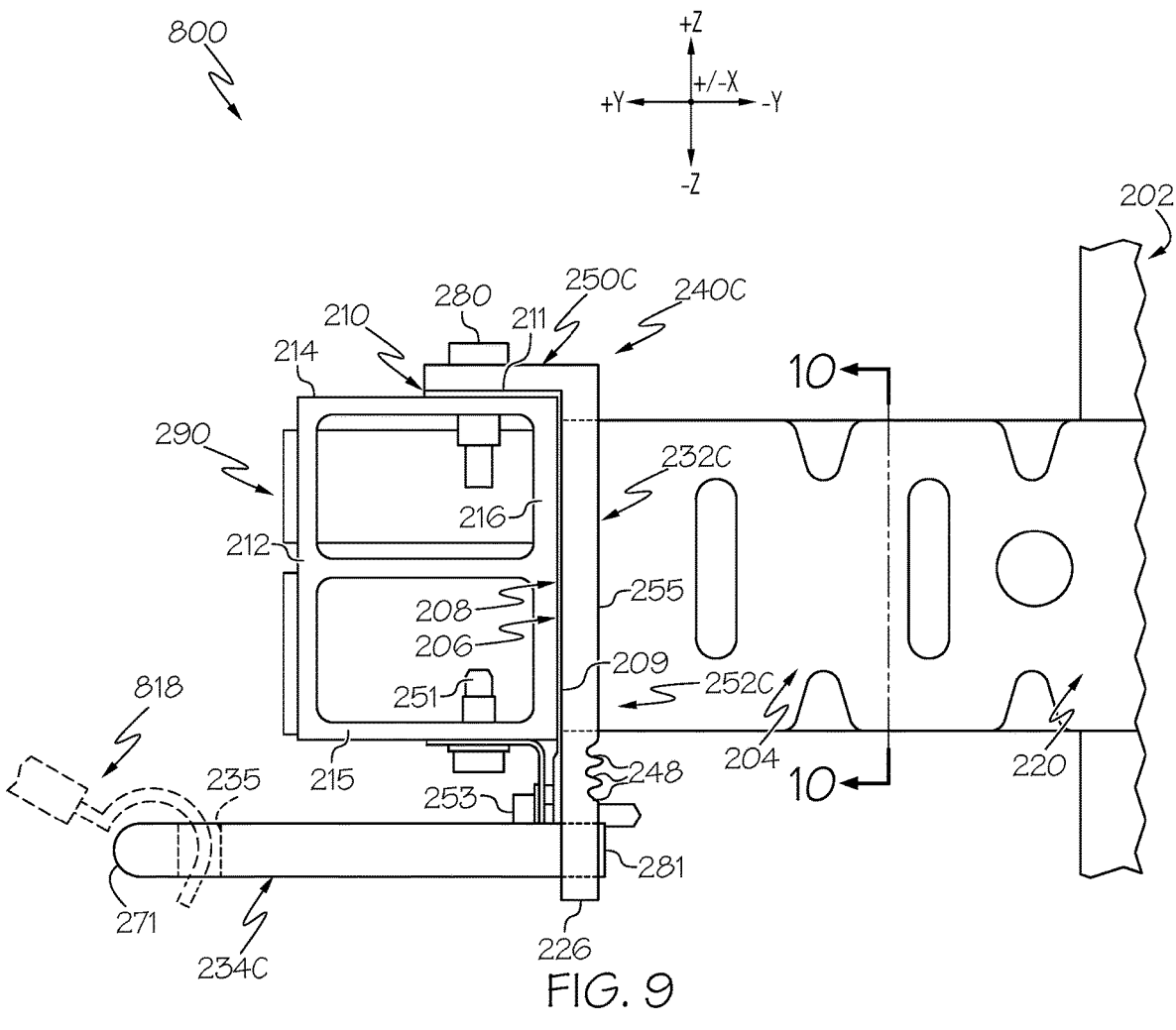
FIG. 9 schematically depicts a side view of another tow hook coupled to the upper wall of the bumper beam, according to one or more embodiments shown and described herein.

Referring now to FIG. 9, a side view of a tow hook assembly 800 is shown. The tow hook assembly 800 is similar to the tow hook assembly 500 discussed herein and illustrated in FIG. 5. As such, like parts will be described herein with like reference numerals. Specifically, the tow hook assembly 800 includes a tow hook 240C including a body 232C. Accordingly, the body 232C includes a first portion 250C and a second portion 252C extending from the first portion 250C and extending along the upper wall 214 of the bumper beam 290 and the rear wall 216 of the bumper beam 290. As discussed in greater detail below, only the first portion 250C of the tow hook 240C is fixed to the bumper beam 290 and the face plate 208. Specifically, only the first portion 250C is fixed to the upper wall 214 of the bumper beam 290 and the upper plate 210 of the face plate 208. The second portion 252C is not fixed to either the and the bumper beam 290, the face plate 208, or the tubular support section 204.

In some embodiments, the body 232C of the tow hook 240C includes one or more weakened portions 248 in the form of recesses, cutouts, or notches formed in a rear surface 255 of the second portion 252C of the body 232C. The weakened portions 248 of the rear surface 255 of the second portion 252C of the body 232C to permit controlled deformation during a front end collision.

The tow hook 240C includes an attachment member 234C extending from a lower end 226 of the second portion 252C of the body 232C in a vehicle longitudinal direction. In embodiments, the attachment member 234C may have rear ends 281 extending from a bridge 714 of the second portion 252C of the body 232C, in the vehicle longitudinal direction, as described in more detail herein. In some embodiments, the attachment member 234C may extend from the lower end 226 of the second portion 252C of the body 232C of the tow hook 240C such that a leading end 271 of the attachment member 234C of the tow hook 240C extends beyond the front wall 212 of the bumper beam 290, i.e., more forward, in the vehicle longitudinal direction. As described herein, the attachment member 234C may be any suitable size and shape such that the attachment member 234C may form an opening, or have a slot formed therein, such as a slot 235, where a tow strap may be coupled.

As described herein, the second portion 252C of the body 232C of the tow hook 240C may be positioned on at least a portion of the rear surface 209 face plate 208 of the connector section 206 of the crush box 220. The first portion 250C of the body 232C of the tow hook 240C may be parallel to the upper surface 211 of the upper plate 210 of the connector section 206 of the crush box 220 and the upper wall 214 of the bumper beam 290. The upper plate 210 of the connector section 206 of the crush box 220 may extend between the first portion 250C of the body 232C of the tow hook 240C and at least a portion of the upper wall 214 of the bumper beam 290 such that the first portion 250C of the body 232C of the tow hook 240C, the upper plate 210 of the connector section 206 of the crush box 220, and the upper wall 214 of the bumper beam 290 may be coupled together via the fastener 280 in the manner discussed herein. The fastener 253 does not engage the second portion 252C of the body 232C. Rather, the body 232C is coupled to the bumper beam 290 by the fastener 280 alone allowing the first portion 250C of the body 232C to pivot at the fastener 280 during a front end collision and allowing the second portion 252C of the body 232C to separate from the rear wall 216 of the bumper beam 290 and the face plate 208 of the connector section 206, as discussed in more detail herein. In embodiments, the tow hook 240C is formed as a one-piece, monolithic structure with the face plate 208 of the connector section 206.

Figure 10:
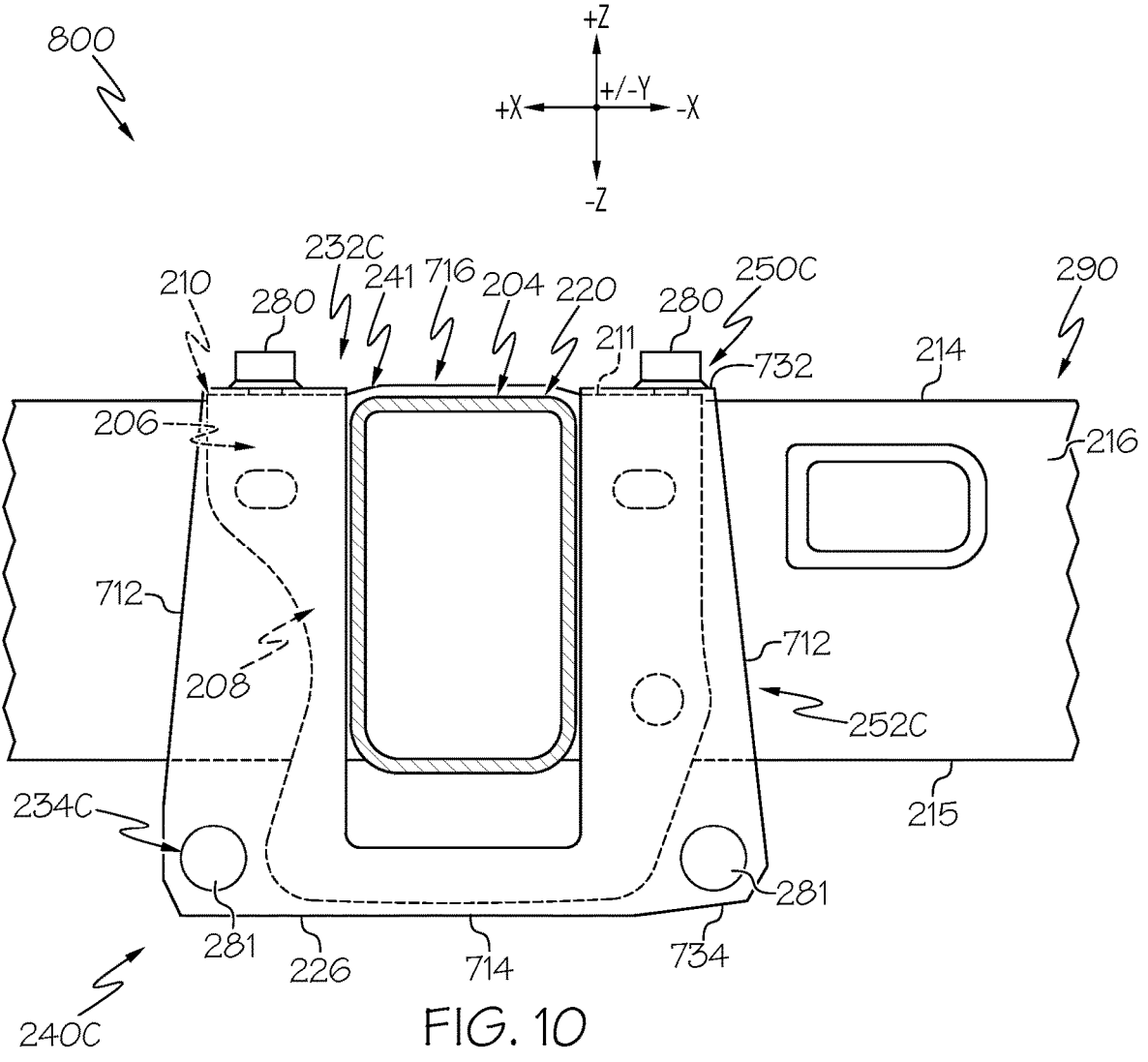
FIG. 10 schematically depicts a rear view of the tow hook of FIG. 9 taken along line 10-10 of FIG. 9, according to one or more embodiments shown and described herein.

Referring now to FIG. 10, a rear view of the tow hook assembly 800 is shown. In one or more embodiments, the second portion 252C of the body 232C has a generally U-shape, specifically, the second portion 252C of the body 232C includes a first end 732, a second end 734 opposite the first end 732, and a pair of legs 712 extending between the first end 732 and the second end 734. The first portion 250C of the body 232C extends from the first end 732 of the second portion 252C of the body 250C in the vehicle longitudinal direction. The second portion 252C of the body 232C of the tow hook 240C may also include the bridge 714 that extends between the pair of legs 712 at the second end 734. Accordingly. the pair of legs 712 are spaced apart from one another and cooperate with the bridge 714 to define a cutout 716 extending through the first end 732 of the second portion 252C of the body 232C. In some embodiments, a width of each leg 712 of the pair of legs 712 gradually increases from the first end 732 of the second portion 252C of the body 232C to the second end 734 of the second portion 252C of the body 232C. As shown in FIG. 10, the second portion 252C of the body 232C of the tow hook 240C may extend downward in the vehicle vertical direction such that the bridge 714 extending between the pair of legs 712 is positioned below the lower wall 215 of the bumper beam 290. The cutout 716 formed in the second portion 252C of the body 232C of the tow hook 240C may be of any suitable shape or size. In some embodiments, the cutout 716 formed in the second portion 252C of the body 232C of the tow hook 240C may be sized so that it is the same, or about the same, as the size of the cutout 241 formed in the face plate 208 of the connector section 206 of the crush box 220.

As discussed herein, the first portion 250 of the body 232C of the tow hook 240C extends from each of the pair of legs 712 at the first end 732 of the second portion 252 of the body 232C of the tow hook 240C in the vehicle longitudinal direction. Accordingly, the first portion 250C of the body 232C is positioned on at least a portion of the upper surface 211 of the upper plate 210 of the connector section 206. In some embodiments, when the cutout 716 is formed the second portion 252C of the body 232C, the cutout 716 extends through the first end 732 of the second portion 252C of the body 232C such that the cutout 716 is also formed in the first portion 250C of the body 232C.

Figure 11:
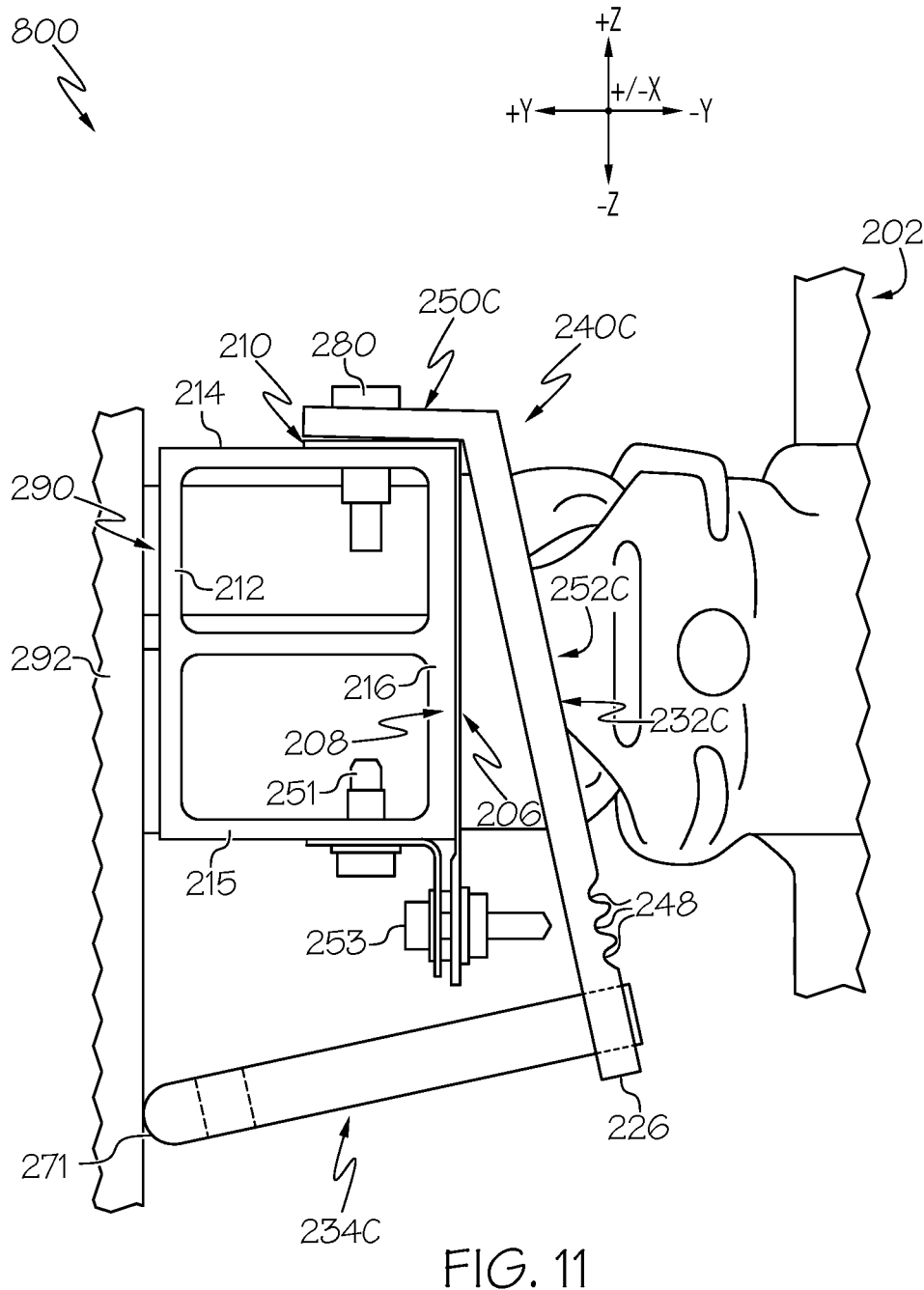
FIG. 11 schematically depicts a side view of the tow hook of FIG. 10 during a first stage of a front end collision, according to one or more embodiments shown and described herein.

Referring now to FIG. 11, a side view of the tow hook assembly 800 is shown during when the leading end 271 of the attachment member 234C of the tow hook 240C is impacted by a force from a barrier 292 such as, for example, another vehicle, a wall, or a pedestrian. As the force from the barrier 292 is directed against the leading end 271 of the attachment member 234C of tow hook 240C, the force first impacts the leading end 271 of the attachment member 234C of the tow hook 240C prior to impacting other components of the tow hook assembly 800 and the vehicle 100 such as, for example, the vehicle frame 202. When the force is applied onto the leading end 271 of the attachment member 234C of the tow hook 240C, the tow hook 240C may begin to bend as only the first portion 250C is secured to the bumper beam 290 and the face plate 208. Specifically, as neither the attachment member 234C and the second portion 252C are not fixed to the bumper beam 290, the face plate 208, or the support section 204, the attachment member 234C may be pushed rearwardly in the vehicle longitudinal direction so as to push the lower end 226 of the second portion 252C of the body 232C rearwardly. This results in the second portion 252C of the body 232C pivoting away from the rear wall 216 of the bumper beam 290 and the face plate 208 of the connector section 206 of the crush box 220. More specifically, the second portion 252C of the body 232C pivots relative to the first portion 250C of the body 232C, which remains fixed to the upper plate 210, at a joined portion or intersection between the first portion 250C and the second portion 252C.

Figure 12:
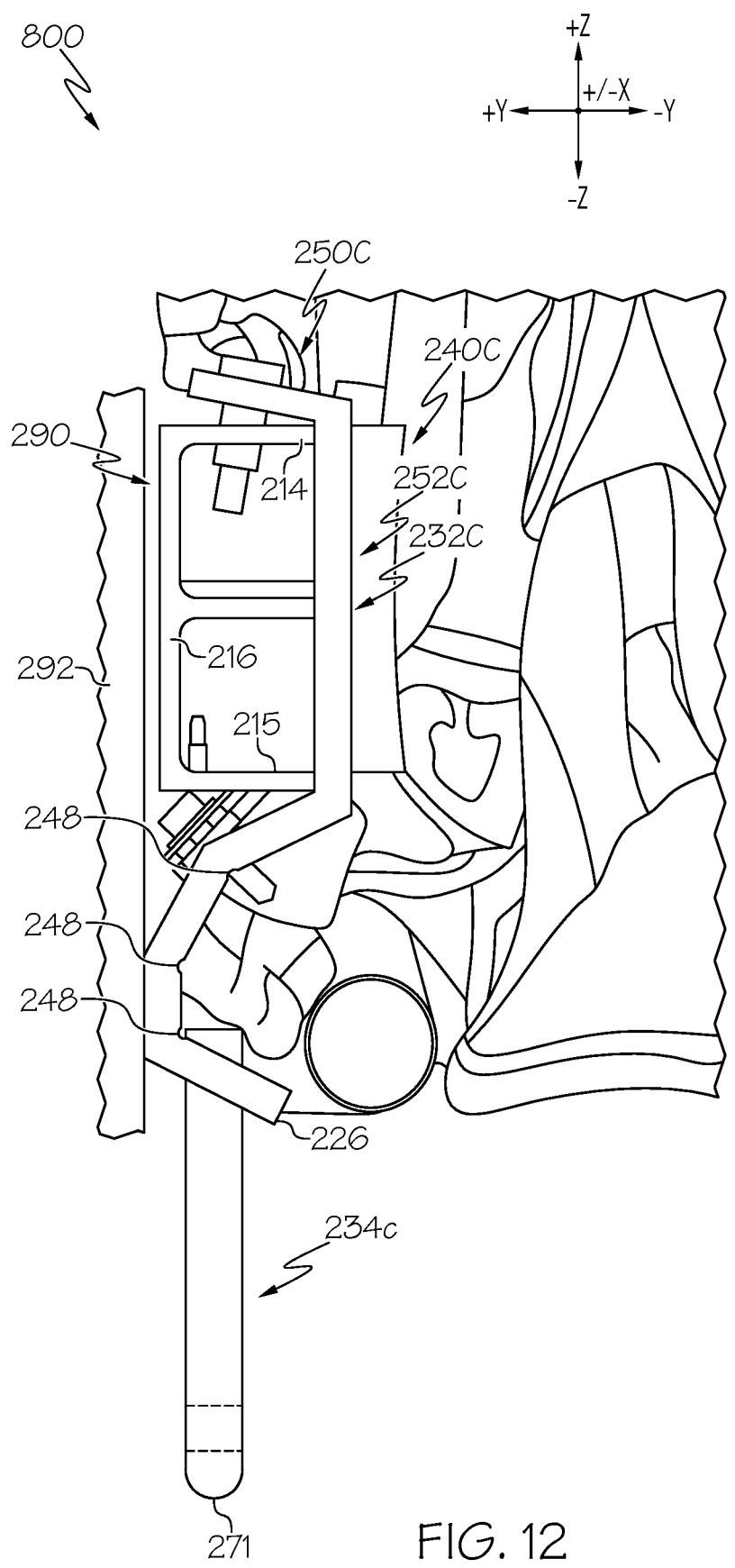
FIG. 12 schematically depicts a side view of the tow hook of FIG. 10 during a second stage of the front end collision, according to one or more embodiments shown and described herein.

Referring now to FIG. 12, a side view of the tow hook assembly 800 is shown after continued force from the barrier 292 has been applied against the leading end 271 of the attachment member 234C of the tow hook 240C indicating a complete crash position. In the complete crash position, the attachment member 234C of the tow hook 240C may extend entirely or substantially in the vehicle vertical direction from the second portion 252C of the body 232C of the tow hook 240C. In addition, when the force is applied against the leading end 271 of the attachment member 234C of the tow hook 240C and subsequently directed to the other components of the tow hook assembly 800 and the vehicle 100, the divots 248 formed in the second portion 252C of the body 232C of the tow hook 240C permit the second portion 252C of the body 232C to bend or collapse and at least partially flatten such that the second portion 252C of the body 232C substantially extends along the vehicle vertical direction and prohibited from extending forward of the front wall 212 of the bumper beam 290 in the vehicle longitudinal direction.

Accordingly, without being bound by any particular theory, it is believed that the specific construction of the tow hook assembly 800 permits the tow hook 240C in a front end collision scenario to substantially flatten such that the body 232C and the attachment member 234C of the tow hook 240C substantially extend in the vehicle vertical direction and reduces portions of the tow hook 240C extending in the vehicle longitudinal direction. Altogether, having the tow hook 240C in a crash scenario flatten so that the body 232C and the attachment member 234C of the tow hook 240C substantially extend in the vehicle vertical direction reduces the risk of one or more parts of the tow hook assembly 800 interfering with other components of the vehicle 100, as well as applying a force against the barrier 292.

From the above, it is to be appreciated that defined herein are embodiments of tow hook assemblies that may include a tow hook having a body and an attachment member positioned within the tow hook assemblies such that the tow hook flattens upon a crash force and the body and attachment member of the tow hook end substantially in the vehicle vertical direction. It is believed that having the body and attachment member of the tow hook end substantially in the vehicle vertical direction upon a front end crash force. Further, it is believed that having the various positioning of the tow hook assemblies as described throughout this application reduces the potential damage to other components of the vehicle when the vehicle is being towed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A tow hook assembly comprising:
   a crush box comprising:
   a support section having a first end and a second end opposite the first end, the support section extending in a vehicle longitudinal direction; and
   a connector section provided at the first end of the support section, the connector section including a face plate extending in a vehicle vertical direction perpendicular to the vehicle longitudinal direction, and an upper plate extending from an upper end of the face plate in the vehicle longitudinal direction; and
   a tow hook comprising:
   a body having a first portion provided on an upper surface of the upper plate of the connector section and extending parallel to the upper plate; and
   an attachment member extending at an oblique angle from the first portion of the body.

2. The tow hook assembly of claim 1, wherein the body of the tow hook further comprises a second portion that extends downward from the first portion of the body in the vehicle vertical direction.

3. The tow hook assembly of claim 2, wherein the second portion of the body of the tow hook comprises a pair of legs extending from the first portion and a bridge extending between the pair of legs opposite the first portion, the pair of legs spaced apart from one another to define a cutout.

4. The tow hook assembly of claim 3, wherein a width of each pair of legs increases from the first portion of the body downward in the vehicle vertical direction.

5. The tow hook assembly of claim 1, wherein the upper plate of the connector section comprises an opening.

6. The tow hook assembly of claim 5, wherein the first portion of the body of the tow hook comprises an opening coaxial with the opening of the upper plate of the connector section.

7. The tow hook assembly of claim 6, further comprising a fastener extending through the opening formed in the first portion of the body of the tow hook and the opening formed in the upper plate of the connector section to secure the tow hook and the connector section to an upper wall of a bumper beam of a vehicle.

8. The tow hook assembly of claim 1, wherein the attachment member of the tow hook extends at an angle of from 130 degrees to 160 degrees from the first portion of the body.

9. The tow hook assembly of claim 1, wherein the attachment member of the tow hook comprises a slot formed therein to receive a tow strap.

10. A tow hook assembly comprising:
    a crush box comprising:

a support section having a first end and a second end opposite the first end, the support section extending in a vehicle longitudinal direction; and a connector section provided at the first end of the support section, the connector section including a face plate extending in a vehicle vertical direction perpendicular to the vehicle longitudinal direction, and an upper plate extending from an upper end of the face plate in the vehicle longitudinal direction; and a tow hook comprising:

a body provided on at least a portion of the face plate of the connector section of the crush box and extending from a first end to a second end opposite the first end in the vehicle vertical direction, the body including a pair of legs extending between the first end and the second end and a bridge extending between the pair of legs at the second end, the pair of legs spaced apart from one another to define a cutout extending through the first end of the body; and an attachment member extending from the first end of the body in the vehicle vertical direction.

11. The tow hook assembly of claim 10, wherein the attachment member of the tow hook comprises a slot formed therein to receive a tow strap.

12. The tow hook assembly of claim 10, wherein a width of each pair of legs increases from the first end of the body to the second end of the body in the vehicle vertical direction.

13. The tow hook assembly of claim 10, wherein the attachment member of the tow hook is positioned above a bumper beam of a vehicle.

14. A tow hook assembly comprising:

a crush box comprising:

a support section having a first end and a second end opposite the first end, the support section extending in a vehicle longitudinal direction; and a connector section provided at the first end of the support section, the connector section including a face plate extending in a vehicle vertical direction perpendicular to the vehicle longitudinal direction, and an upper plate extending from an upper end of the face plate in the vehicle longitudinal direction; and a tow hook comprising:

a body provided on at least a portion of the face plate of the connector section of the crush box and extending downward from a first end to a second end opposite the first end in the vehicle vertical direction, the body including a pair of legs extending between the first end and the second end and a bridge extending between the pair of legs at the second end, the pair of legs spaced apart from one another to define a cutout extending through the first end of the body; and an attachment member extending from the second end of the body in the vehicle longitudinal direction.

15. The tow hook assembly of claim 14, wherein the attachment member of the tow hook comprises a slot formed therein to receive a tow strap.

16. The tow hook assembly of claim 14, wherein a width of each pair of legs increases from the first end of the body to the second end of the body in the vehicle vertical direction.

17. The tow hook assembly of claim 14, wherein the attachment member of the tow hook extends from the bridge of the body of the tow hook.

18. The tow hook assembly of claim 14, wherein the attachment member of the tow hook extends forward of a front wall of a bumper beam in the vehicle longitudinal direction.

* * * * *